Patented June 27, 1933

1,915,526

UNITED STATES PATENT OFFICE

NATHAN GRAY, OF BROOKLYN, NEW YORK

EGG PRODUCT AND METHOD OF MAKING THE SAME

No Drawing.  Application filed March 27, 1930. Serial No. 439,533.

This invention relates to egg products made from freshly broken eggs and to the methods of making the same.

An object of this invention is the provision of a highly improved, homogeneous egg product of the character described, which may be frozen and shipped and stored in frozen condition, and which will retain the whites and yolks thoroughly and uniformly mixed during the freezing process and when thawing or defrosting the frozen product before use.

A further object of this invention is to provide a product of the character described which shall be of attractive color and palatable in taste and which, when mixed with dough, will cause rising thereof for baking purposes.

A still further object of this invention is to provide an improved process for making an egg product of the character described, which shall be simple and comparatively inexpensive to carry out, and yet practical to a high degree.

Other objects of my invention will hereinafter appear in the following specification and the novel features thereof will be particularly pointed out in the appended claims.

My improved egg product preferably comprises thoroughly mixed eggs, including the yolks and whites broken out of the shell, pure animal gelatine, cream of tartar, ammonium carbonate, sugar syrup and a food color. The product may be frozen and canned for shipment and is defrosted before incorporating with other ingredients such as flour and the like in the making of bread, cake and other foods.

The eggs used in the making of my improved product are preferably the whole product freshly broken out of the shell of suitable candled eggs and mixed and combined with the other ingredients, as will hereinafter more specifically appear, and frozen shortly thereafter.

A pure animal gelatine is preferably used in proportions varying from $\frac{1}{5}\%$ to $\frac{1}{2}\%$. The gelatine serves when used alone or combined with cream of tartar and ammonium carbonate or with one of said substances, to substantially obviate the possibility of separation of the yolks and whites of the eggs, either at the time of packing the batter for freezing purposes or when defrosting the frozen product for use. The gelatine thus aids in maintaining a homogeneous, uniform, emulsified, thoroughly combined mixture so that small quantities of the defrosted product will contain proper proportions of both the whites and yolks as well as the other ingredients.

From $\frac{1}{4}\%$ to $1\%$ of cream of tartar may be used and when combined with the gelatine serves to hold the whites and yolks of the eggs together, produces a uniform mixture, and aids in causing uniform freezing throughout the mass. Furthermore, the cream of tartar helps in the rising of the dough when mixed with my improved egg product, as when making bread, cake and the like baked goods.

The ammonium carbonate may be used in addition to the cream of tartar or may be substituted therefor. Preferably $\frac{1}{4}\%$ to $1\%$ of the carbonate is used depending upon whether it is used alone or in combination with the cream of tartar. The ammonium carbonate likewise aids in the rising of dough mixed with the egg product.

Furthermore, I have found that the quality, sweetness and taste of the egg product is preserved for long periods and improves with age when using the cream of tartar or ammonium carbonate or both.

The sugar syrup is used for thickening the batter and making the same more palatable. Preferably $\frac{1}{2}$ lb. to 1 lb. of the syrup is used for every 30 lbs. of egg product.

Eggs layed at certain times of the year, especially the spring time, are mostly white and the yolks are comparatively small. Such eggs are substantially full, that is, there is no space in the shell. When such eggs are mixed for the purpose of making a frozen egg product, it has been found that the color of the batter is too light and unattractive although the eggs are of a generally superior quality. For improving the color of the batter whereby the better eggs may be used, a certified food color is mixed with the broken eggs. Preferably, a coloring matter comprising a combination of two basic colorings such as ponceau and tratraxine, has been found to give good results. Minute quantities of the coloring matter such as 1/100% is sufficient to give the batter the color of palatable mixed eggs.

Although as stated above, a pure animal gelatine is preferred for mixing with the eggs, it will be understood that other suitable substantially neutral, edible, water soluble, organic, gelatenous substances may be substituted for or mixed with the pure gelatine, said substances preferably being in the form of hydrophyllic colloids for producing a uniform emulsion, whereby the whites and yolks will be retained intimately mixed, and separation of said whites and yolks substantially prevented during either the freezing or defrosting processes. Furthermore, substances, other than the preferred cream of tartar and ammonium carbonate, such as will cooperate with the gelatine in retaining the batter in the emulsified form and will furthermore cause rising of dough mixed with the egg product, may be substituted for said preferred ingredients or mixed therewith.

It will be understood furthermore, that one or more of the various substances enumerated above may be omitted from the batter when desired.

As an example, I have found that a frozen egg product comprising the following substances gives good results: freshly broken mixed eggs, ¼% by weight gelatine, ½% by weight of cream of tartar, ½% by weight ammonium carbonate, ½ lb. sugar syrup to every 30 lbs. of mixed eggs, 1/100% of coloring matter.

The method of making my improved egg product is as follows:

The eggs are candled to procure suitable eggs. The selected eggs are broken and the whole egg meat, that is the whites and yolks, dumped into a vessel. The whole eggs are then mixed thoroughly to make a uniform mixture. The gelatine, preferably in powder form, is dissolved or mixed with a solution of the cream of tartar or a solution of the latter and the ammonium carbonate. The solution including the gelatine is then mixed with the egg mixture and the resulting batter mixed to obtain a proper consistency. During the last named mixing operation, the sugar syrup and the coloring matter may be added gradually. The thoroughly mixed resulting product may then be poured into vessels such as cans and frozen solid in a suitable refrigerator. The frozen product may be shipped and stored in frozen condition until shortly before use. The frozen egg product is then defrosted or thawed out in any suitable manner to form a liquid product for use in baking and for other suitable purposes.

It will thus be seen that I have provided an article and method in which the several objects of this invention are achieved and which are adapted to meet the conditions of practical use.

As various possible embodiments might be made of the above invention, and as various changes might be made in the embodiments above set forth, it is to be understood that all matter herein set forth, is to be interpreted as illustrative and not in a limiting sense.

Having thus described my invention, I claim as new and desire to secure by Letters Patent:

1. An egg product of the character described comprising frozen mixed eggs, gelatine, cream of tartar and ammonium carbonate.

2. An egg product of the character described comprising frozen mixed eggs, gelatine, cream of tartar, ammonium carbonate, sugar syrup, and a food coloring substance.

3. A food product comprising a mixture of broken eggs, ¼% by weight of gelatine, ½% by weight of cream of tartar, ½% by weight of ammonium carbonate, 1/60 by weight of sugar syrup, and 1/100% of coloring matter.

4. A frozen egg product comprising a mixed egg meat, ⅕ to ½% of gelatine, to ¼ to 1% of cream of tartar, ½ lb. to 1 lb. of syrup for every 30 lbs. of egg meat and substantially 1/100% of coloring matter.

In testimony whereof I affix my signature.

NATHAN GRAY.